(12) United States Patent
Tang et al.

(10) Patent No.: US 11,933,914 B2
(45) Date of Patent: Mar. 19, 2024

(54) SENSING SYSTEM FOR AN INTERACTIVE SYSTEM

(71) Applicant: Universal City Studios LLC, Universal City, CA (US)

(72) Inventors: Griffin Tang, Orlando, FL (US); Howard Bruce Mall, Winter Springs, FL (US)

(73) Assignee: Universal City Studios LLC, Universal City, CA (US)

( * ) Notice: Subject to any disclaimer, the term of this patent is extended or adjusted under 35 U.S.C. 154(b) by 562 days.

(21) Appl. No.: 17/158,784

(22) Filed: Jan. 26, 2021

(65) Prior Publication Data
US 2021/0311165 A1    Oct. 7, 2021

Related U.S. Application Data

(60) Provisional application No. 63/005,883, filed on Apr. 6, 2020.

(51) Int. Cl.
*G01S 7/41*     (2006.01)
*G01S 7/48*     (2006.01)
*G01S 7/539*    (2006.01)

(52) U.S. Cl.
CPC ............ *G01S 7/411* (2013.01); *G01S 7/4802* (2013.01); *G01S 7/4808* (2013.01); *G01S 7/539* (2013.01)

(58) Field of Classification Search
CPC ...... G01S 7/411; G01S 7/4802; G01S 7/4808; G01S 7/539
USPC ..................................................... 342/451
See application file for complete search history.

(56) References Cited

U.S. PATENT DOCUMENTS

| | | | |
|---|---|---|---|
| 4,384,280 A | 5/1983 | Haag | |
| 5,866,887 A | 2/1999 | Hashimoto et al. | |
| 2009/0108184 A1 | 4/2009 | Iwasawa | |
| 2012/0075110 A1 | 3/2012 | Boughorbel et al. | |
| 2015/0331102 A1* | 11/2015 | Cheatham, III | ........ G01S 15/46 702/143 |
| 2016/0239153 A1 | 8/2016 | Holmgren et al. | |
| 2019/0220634 A1 | 7/2019 | Cossairt et al. | |

FOREIGN PATENT DOCUMENTS

| | | | |
|---|---|---|---|
| CN | 104503634 A | 4/2015 | |
| JP | H10162256 A | 6/1998 | |
| WO | WO-2019097292 A1 * | 5/2019 | ............ A63G 31/00 |

OTHER PUBLICATIONS

PCT/US2021/025185 Invitation to Pay Additional Fees dated Jul. 15, 2021.

* cited by examiner

*Primary Examiner* — Harry K Liu
(74) *Attorney, Agent, or Firm* — Fletcher Yoder, P.C.

(57) ABSTRACT

An interactive system includes a device configured to output a signal toward a surface such that the signal reflects off the surface at an angle and along a path of travel, and such that an object that interrupts the path of travel of the signal causes a return signal to travel in a reverse direction along the path of travel for receipt by the device. The interactive system also includes a control system communicatively coupled to the device. The control system is configured to receive data from the device, in which the data is associated with the receipt of the return signal by the device, and determine a position of the object relative to the device based on the data.

20 Claims, 8 Drawing Sheets

SENSING SYSTEM FOR AN INTERACTIVE SYSTEM

CROSS REFERENCE TO RELATED APPLICATIONS

This application claims priority from and the benefit of U.S. Provisional Application Ser. No. 63/005,883, entitled "SENSING SYSTEM FOR AN INTERACTIVE SYSTEM," filed Apr. 6, 2020, which is hereby incorporated by reference in its entirety for all purposes.

BACKGROUND

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

An amusement park includes various attractions that provide a unique experience for guests of the amusement park. For example, the amusement park may include various rides and show performances. With the increasing sophistication and complexity of attractions, there is a corresponding increase in expectations regarding entertainment quality of the attractions. As a result, improved and more creative attractions are needed.

BRIEF DESCRIPTION

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an interactive system includes a device configured to output a signal toward a surface such that the signal reflects off the surface at an angle and along a path of travel, and such that an object that interrupts the path of travel of the signal causes a return signal to travel in a reverse direction along the path of travel for receipt by the device. The interactive system also includes a control system communicatively coupled to the device. The control system is configured to receive data from the device, in which the data is associated with the receipt of the return signal by the device, and determine a position of the object relative to the device based on the data.

In an embodiment, an interactive system includes a first surface, a second surface positioned opposite to the first surface to form a space between the first surface and the second surface, and a device configured to output a signal toward the first surface such that the signal reflects off the first surface and toward the second surface along a path of travel, and such that an object that interrupts the path of travel of the signal causes the signal to reflect off the object and form a return signal that travels in a reverse direction along the path of travel for receipt by the device. The interactive system also includes a control system communicatively coupled to the device. The control system is configured to receive data from the device, in which the data is associated with the receipt of the return signal by the device, and determine a presence of the object within the space based on the data.

In an embodiment, an interactive system includes a first surface, a second surface positioned relative to the first surface to form a space between the first surface and the second surface, and a device configured to output a signal into the space such that the signal reflects off the first surface and the second surface along a path of travel within the space, and such that an object that interrupts the path of travel of the signal causes the signal to reflect off the object and form a return signal that travels in a reverse direction along the path of travel for receipt by the device. The device is configured to determine a distance traveled by the return signal upon the receipt of the return signal. The interactive system also includes a control system communicatively coupled to the device. The control system is configured to receive data from the device, in which the data is indicative of the distance traveled by the return signal, and determine a position of the object relative to the device based on the data.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
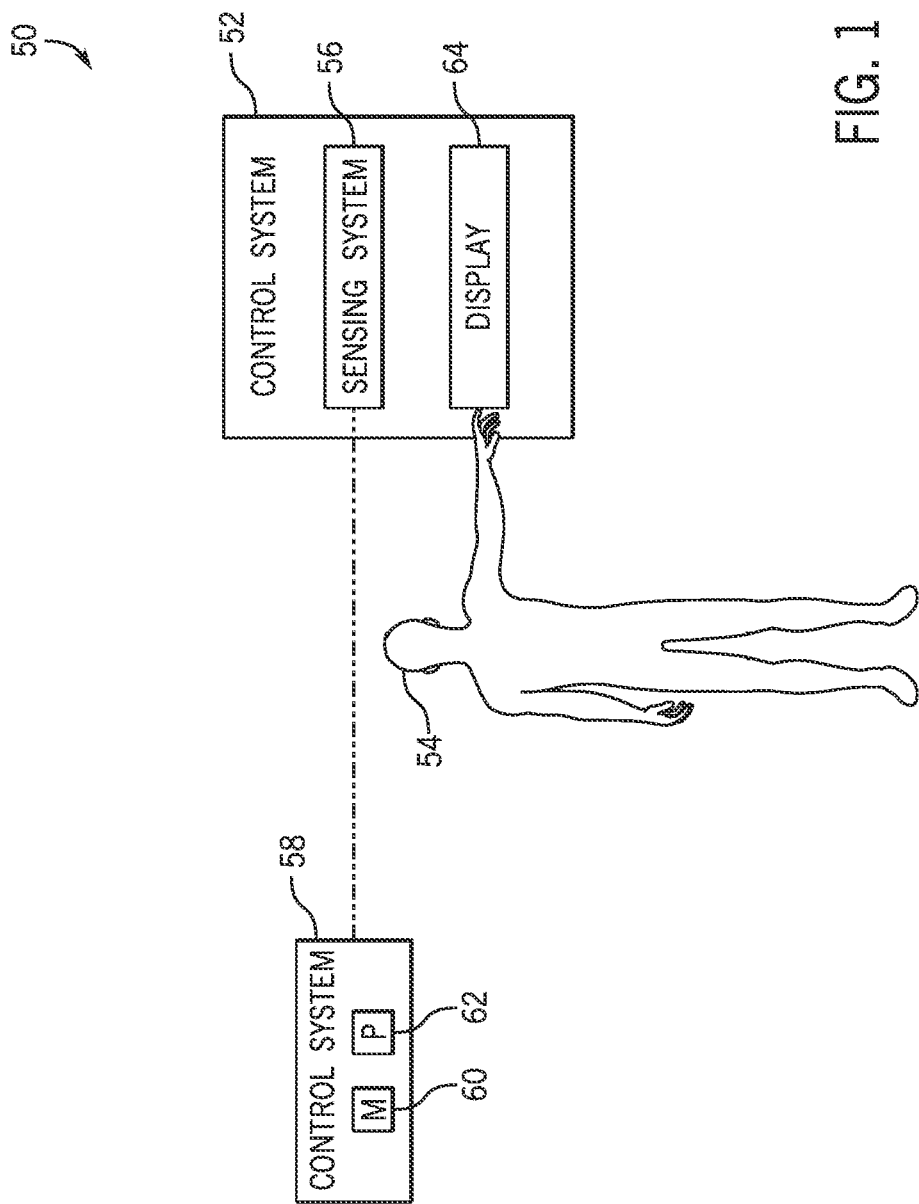
FIG. 1 is a schematic diagram of an embodiment of an interactive system having an interactive feature and a sensing system, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure is related to a sensing system configured to detect an interaction. The sensing system may be used for an attraction, such as an attraction within an amusement park. For example, the attraction may include a feature (e.g., a physical prop, a display screen, a wall surface) with which a guest of the attraction may interact. The sensing system may be used to detect an occurrence and/or to determine a location of the interaction between the guest and the feature, such as a particular portion of the feature touched by the guest. The feature may then be updated based on the detected interaction between the guest and the feature, such as to provide the guest with a unique entertainment experience. Various other actions may be taken based on the detected interaction between the guest and the feature, such as to store information related to the interaction, and so forth.

In particular, embodiments of the present disclosure are directed to a sensing system having a device (e.g., a rangefinder device) configured to emit a signal (e.g., laser, infrared light) that travels along a path traversing multiple directions. For example, the sensing system may include a first surface and a second surface positioned opposite one another so as to form a space between one another. The device may be configured to output the signal toward the first surface such that the signal reflects off the first surface and toward the second surface. The signal may then continue to travel within the space by reflecting off the first and second surfaces in order to travel along a substantial length of the space. If an object, such as the guest, is positioned within the space to interrupt a path of travel of the signal, the signal may reflect off the object to return to and be received by the device. The received signal may then facilitate determination of the position of the object within the space. Such a sensing system may therefore facilitate detection of the occurrence and/or determination of the location of the interaction between the object and the signal without having to use multiple sensors, such as multiple sensors positioned at various locations to emit respective signals in different directions. As such, the disclosed sensing system may reduce a cost and/or complexity associated with the manufacture, the operation, and/or the maintenance of the sensing system.

With the preceding in mind, FIG. 1 is a schematic diagram of an embodiment of an interactive system 50 having an interactive feature 52 (e.g., a physical prop, a display screen, a wall surface). A user 54 (e.g., a guest of an attraction) may interact with the interactive feature 52 during operation of the interactive system 50. For instance, the user 54 may contact a portion of the interactive feature 52. The interactive feature 52 may include or be associated with a sensing system 56 configured to facilitate detection of the occurrence and/or determination of the location of the interaction between the user 54 and the interactive feature 52. That is, the sensing system 56 may detect that the user 54 has interacted with the interactive feature 52, and the sensing system 56 may determine the location of the interaction relative to the interactive feature 52. Although FIG. 1 illustrates the user 54 interacting with the interactive feature 52, it should be noted that the sensing system 56 may detect an interaction between the interactive feature 52 and any suitable object, such as a vehicle, debris, and so forth.

In an embodiment, the sensing system 56 is communicatively coupled to a control system 58 (e.g., an electronic controller) of the interactive system 50. The control system 58 may include a memory 60 and a processor 62, such as a microprocessor. The memory 60 may include volatile memory, such as random access memory (RAM), and/or non-volatile memory, such as read-only memory (ROM), optical drives, hard disc drives, solid-state drives, or any other non-transitory computer-readable medium that includes instructions to operate the interactive system 50. The processor 62 may include one or more application specific integrated circuits (ASICs), one or more field programmable gate arrays (FPGAs), one or more general purpose processors, or any combination thereof, configured to execute the instructions stored in the memory 60 to operate the sensing system 56 and/or other components of the interactive system 50, such as to determine the location of the interaction between the user 54 and the interactive feature 52.

In one embodiment, the interactive system 50 may be a part of an attraction, which may be within an amusement park. By way of example, the interactive feature 52 may be a part of an interactive activity (e.g., a game, a show, a ride) and may have a display 64 (e.g., a display screen, a wall surface) that is configured to display images that are viewable and/or selectable by the user 54. For example, the user 54 may interact with the interactive feature 52, such as by touching to select one of the images presented on the display 64. In an additional or alternative embodiment, the interactive system 50 may be a part of a path navigated by the user 54, and the interactive feature 52 may facilitate a determination of a characteristic of the user 54. In an example, the control system 58 may determine where the user 54 navigates the path based on the interaction between the user 54 and the interactive feature 52. In an example, the control system 58 may determine a physical property (e.g., a height, a profile) of the user 54 via the sensing system 56. In an example, the interactive feature 52 may be a part of a boundary fence (e.g., of an enclosure), and the control system 58 may determine an interaction with the boundary fence to determine a security characteristic of the boundary fence.

The control system 58 may also perform additional operations of the interactive system 50 based on the interaction, such as based on the determined location of interaction between the user 54 and the interactive feature 52. As an example, the control system 58 may update the display 64 (e.g., change an image on the display 64) of the interactive feature 52 and/or another part of the interactive system 50 (e.g., an animated figure, a movement of a ride vehicle, lights, sounds) to provide the user 54 with a more interactive activity for entertainment purposes. As an example, the control system 58 may control operation of the sensing system 56, such as how the sensing system 56 is positioned relative to the interactive feature 52. Thus, the control system 58 may adjust how the location of interaction between the user 54 and the interactive feature 52 may be determined.

Figure 2:
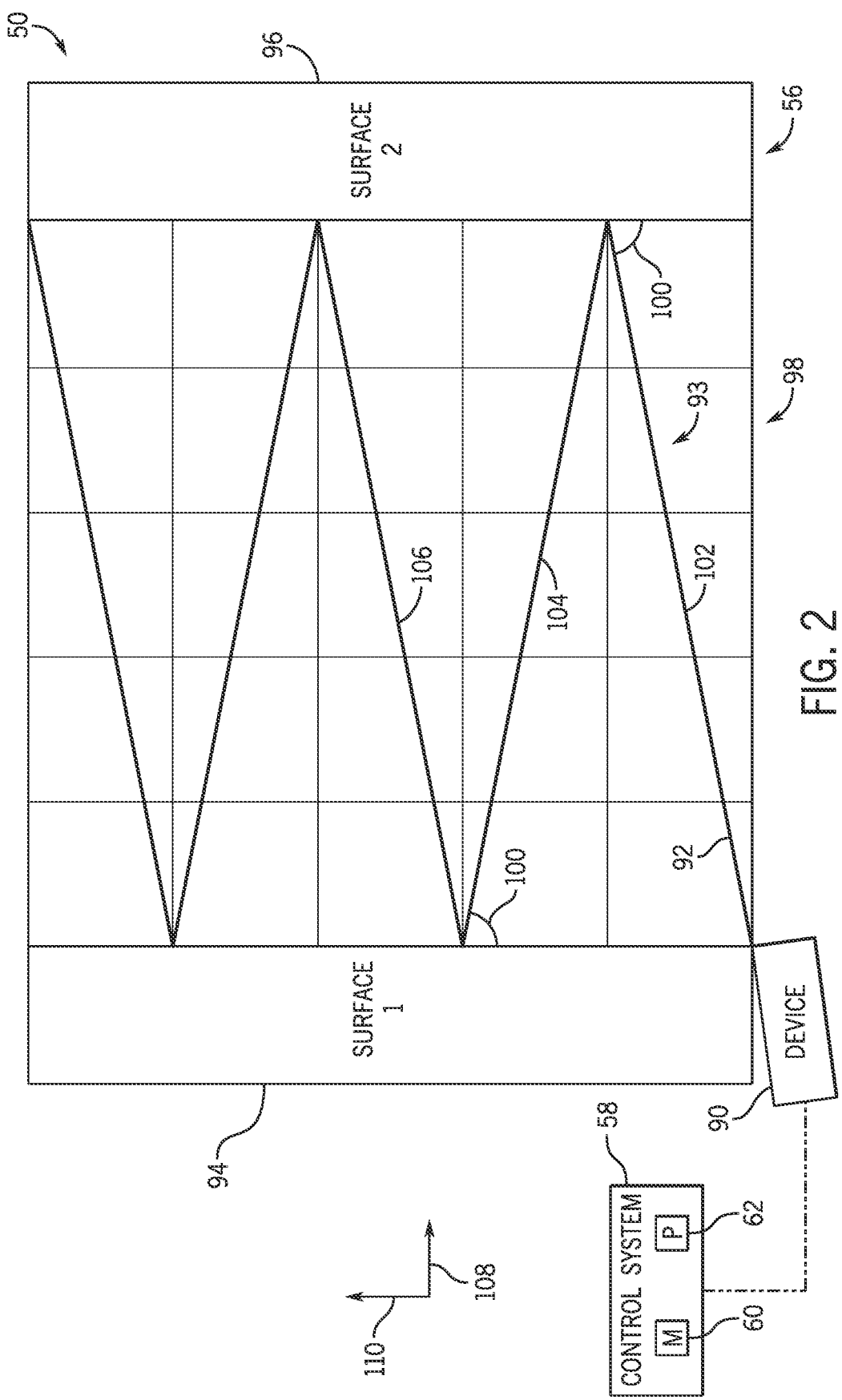
FIG. 2 is a schematic diagram of an embodiment of the interactive system of FIG. 1, in which the sensing system is configured to output a signal that travels along two axes, in accordance with an aspect of the present disclosure.

FIG. 2 is a schematic diagram of an embodiment of the interactive system 50 having the sensing system 56. The illustrated sensing system 56 includes a device 90 configured to output a signal 92 (e.g., via a transmitter of the device 90). For instance, the device 90 may include any suitable ranging or rangefinder device, such as a laser ranging device, a light detection and ranging (LIDAR) device, a radar device, a sound navigation ranging (sonar) device, a photometer, an ultrasonic ranging device, or any other suitable device. Further, the signal 92 may include light (e.g., infrared light, visible light, ultraviolet light) or another suitable component that may travel along a path (e.g., a signal path). After being output by the device 90, the signal 92 may reflect off an object (e.g., the user 54 of FIG. 1) to return to and be received by the device 90 (e.g., via a receiver of the device 90). Based on one or more characteristics of the return of the signal 92, such as the time of travel of the signal 92, a wavelength of the signal 92, and/or an angle of receipt of the signal 92, the device 90 (or the control system 58) may determine a distance between the device 90 and the object. Thus, the device 90 may facilitate determining a location of the object relative to the device 90 and relative to the interactive feature 52.

In an embodiment, the sensing system 56 may guide the signal 92 to travel along a particular path of travel 93 (e.g., a signal path) of the interactive system 50. To this end, the sensing system 56 may include a first surface 94 and a second surface 96, which may each be made of a reflective material, such as metal or glass. The first surface 94 and the second surface 96 may be positioned relative (e.g., opposite) to one another to form a space 98 between the surfaces 94, 96. For example, the first surface 94 and the second surface 96 may be substantially parallel to one another. The device 90 may be oriented and positioned relative to the surfaces 94, 96 to output the signal 92 to contact the second surface 96 at an angle 100 that is not substantially perpendicular to the second surface 96, such that the signal 92 travels a first length 102 from the device 90 to the second surface 96. Due to the reflective property of the second surface 96, the signal 92 may reflect off the second surface 96 within the space 98 to contact the first surface 94 at the angle 100 (e.g., an angle that is not substantially perpendicular to the first surface 94). Thus, the signal 92 travels a second length 104 from the second surface 96 to the first surface 94, in which the distance spanned by the second length 104 is substantially equal to the distance spanned by the first length 102. The reflective property of the first surface 94 then reflects the signal 92 to contact the second surface 96 at the angle 100 to travel a third length 106, and the signal 92 may continue to travel along respective lengths (e.g., vertical lengths) of the surfaces 94, 96 within the space 98 and away from the device 90 by reflecting between the first surface 94 and the second surface 96 as long as there are no objects interrupting the path of travel 93 of the signal 92. In this way, the path of travel 93 of the illustrated signal 92 may include a zigzag or wave-like (e.g., triangle wave) pattern extending away from the device 90 through the space 98.

Although the illustrated signal 92 travels within the space 98 along five units indicated by gridlines across the space 98 relative to the length of the surfaces 94, 96, the signal 92 may travel along any suitable number of units based on a parameter of the surfaces 94, 96 (e.g., a length, a reflective property), a parameter of the signal 92 (e.g., a signal strength), and/or a parameter of the device 90 (e.g., an orientation). In an embodiment, the signal 92 may substantially travel along a plane formed by a first axis 108 (e.g., a lateral axis, an x-axis) and a second axis 110 (e.g., a vertical axis, a y-axis), such as by reversing direction relative to the first axis 108 each time the signal 92 reflects off one of the surfaces 94, 96. Thus, the signal 92 may travel in two dimensions within the space 98, and the various lengths may have certain relationships to one another. For example, the first length 102 and the third length 106 may be substantially parallel to one another, while the second length 104 and the third length 106 may be symmetrical about an axis that is substantially parallel to the first axis 108.

It should be noted that the path of travel 93 of the signal 92 within the space 98 may be based on the orientation of the device 90 relative to the surfaces 94, 96. In the illustrated embodiment, the space 98 spans five units relative to the first axis 108 and five units indicated by gridlines across the space 98 relative to the second axis 110. Further, the device 90 is oriented such that each length (e.g., the lengths 102, 104, 106) of the signal 92 extends five units relative to the first axis 108 and one unit relative to the second axis 110. In this way, the signal 92 may be considered to have a one unit resolution. However, changing the orientation of the device 90 (e.g., to change the angle 100 of contact between the signal 92 and the second surface 96) may change a characteristic of the lengths (e.g., the lengths 102, 104, 106) of the signal 92. For instance, reducing the angle 100 may increase the resolution. As an example, each length (e.g., the lengths 102, 104, 106) of the signal 92 may extend five units relative to the first axis 108 and two units relative to the second axis 110, such that the signal 92 has a two unit resolution, and the path of travel 93 may include a smaller number of lengths within the space 98 to span the lengths of the surfaces 94, 96. Moreover, increasing the angle 100 may reduce the resolution. As another example, each length of the signal 92 may extend five units relative to the first axis 108 and half of a unit relative to the second axis 110, such that the signal 92 has a half unit resolution, and the signal 92 may include a greater number of lengths within the space 98 to span the lengths of the surfaces 94, 96.

Figure 3:
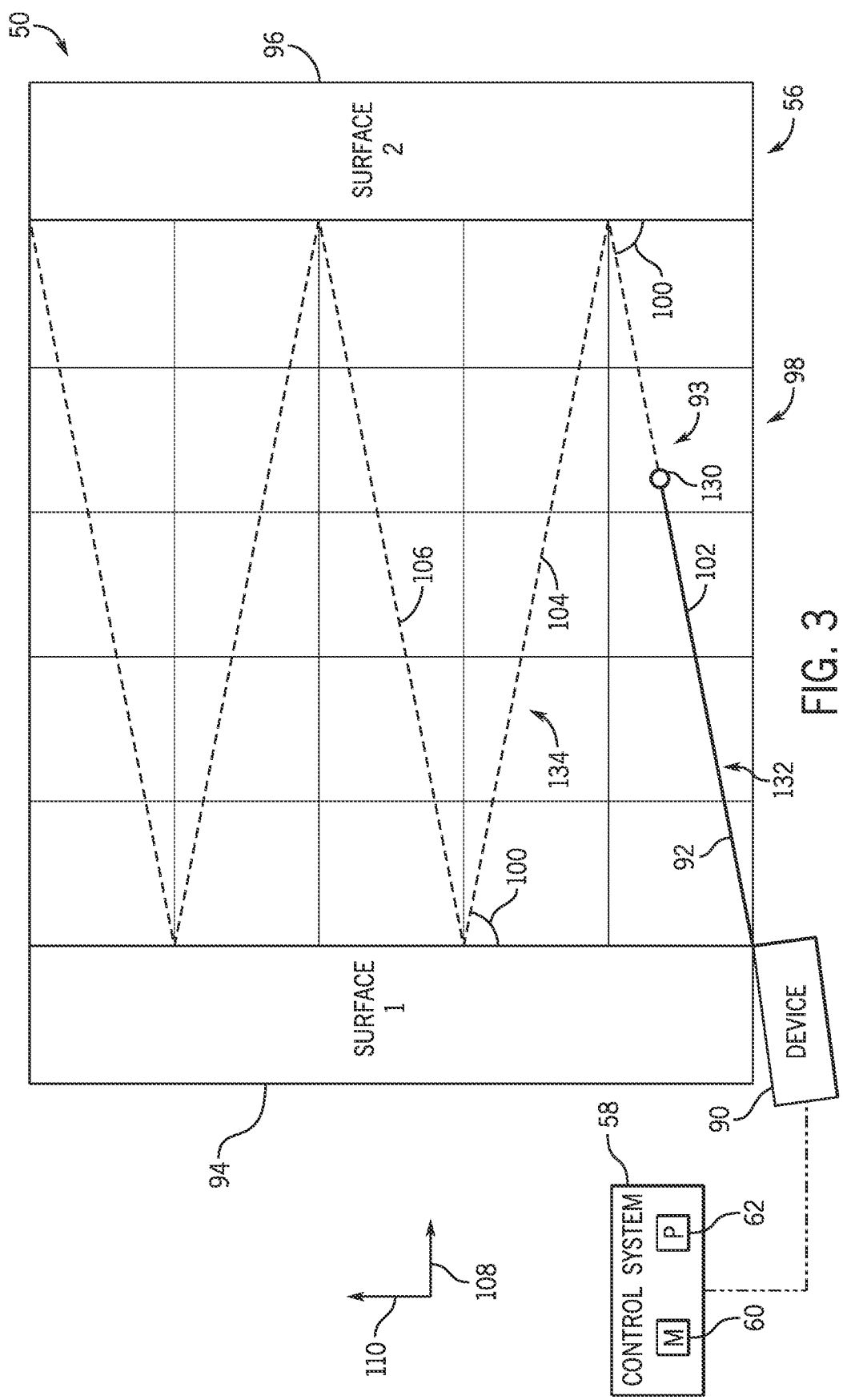
FIG. 3 is a schematic diagram of the interactive system of FIG. 1, in which the sensing system is being used to detect an interaction with the interactive feature, in accordance with an aspect of the present disclosure.

FIG. 3 is a schematic diagram of the interactive system 50, in which the sensing system 56 is being used to detect an object 130 (e.g., a part of a guest) within the space 98 and to determine a location of the object 130 within the space 98 relative to the device 90. In the illustrated embodiment, the object 130 is positioned along the first length 102 of the path of travel 93 of the signal 92. As a result, the signal 92 may travel along a first portion 132 of the path of travel 93, illustrated by a solid line in FIG. 3. The signal 92 may then reflect off the object 130 to return to the device 90 (e.g., as a return signal) in a reverse direction along the first portion 132 of the path of travel 93. Therefore, the signal 92 does not travel along a second, remaining portion 134 of the path of travel 93, illustrated by the dashed lines in FIG. 3. Instead, the signal 92 travels from the object 130 back to the device 90 by traveling in the reverse direction along the first portion 132 of the path of travel 93.

The device 90 may receive the signal 92 and may determine a distance traveled by the signal 92 (e.g., along the first portion 132 of the path of travel 93) based on properties of the signal 92. For example, the properties of the signal 92 may indicate the distance traveled is associated with the first portion 132. The device 90 may transmit the determined distance to the control system 58, and the control system 58 may determine the position of the object 130 within the space 98 relative to the device 90 based on the determined distance and parameters associated with the path of travel 93 of the signal 92. The control system 58 may determine a first coordinate (e.g., an x-coordinate) relative to the first axis 108 via the following Equation 1:

$$x = \text{sine}(a) * D \qquad \text{Equation 1}$$

in which x is the first coordinate, a is the angle 100 of contact between the signal 92 and the second surface 96, and D is the distance of travel in the reverse direction along the path of travel 93 (e.g., the first portion 132, in the illustrated embodiment). Moreover, the control system 58 may determine a second coordinate (e.g., a y-coordinate) relative to the second axis 110 via the following Equation 2:

$$y = \text{cosine}(a) * D \qquad \text{Equation 2}$$

in which y is the second coordinate, a is the angle 100 of contact between the signal 92 and the second surface 96, and D is the distance of travel in the reverse direction along the path of travel 93 (e.g., the first portion 132, in the illustrated embodiment). Accordingly, the control system 58 may determine the first coordinate and the second coordinate of the object 130 within the space 98 based on the distance determined by the device 90.

Figure 4:
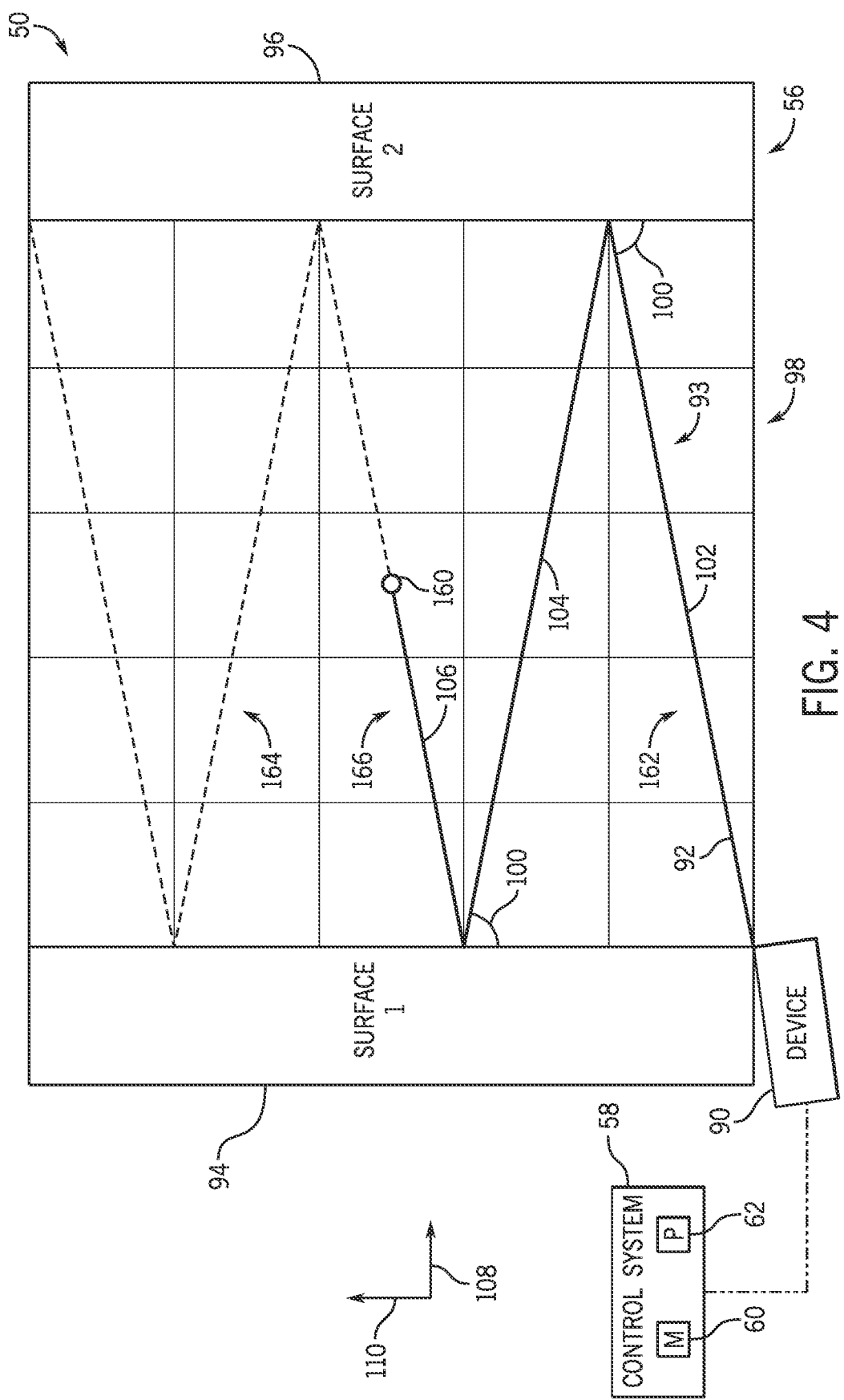
FIG. 4 is a schematic diagram of the interactive system of FIG. 1, in which the sensing system is being used to detect another interaction with the interactive feature, in accordance with an aspect of the present disclosure.

FIG. 4 is a schematic diagram of the interactive system 50, in which the sensing system 56 is being used to detect another object 160 within the space 98 and to determine a location of the object 160 within the space 98 relative to the device 90. While FIGS. 3 and 4 are described with reference to different objects (e.g., the object 130 of FIG. 3 and the object 160 of FIG. 4) to facilitate discussion and for image clarity, it should be noted that the techniques may be utilized to detect the same object (e.g., the object 130 of FIG. 3) in different locations (e.g., in the location of FIG. 3 at one time and in the location of FIG. 4 at another time, such as during a sequence of interactions between the object 130 and the interactive system 50) and within the space 98.

In the illustrated embodiment, the object 160 is positioned along the third length 106 of the path of travel 93 of the signal 92. As a result, the signal 92 may travel along a third portion 162 of the path of travel 93, illustrated by a solid line in FIG. 4. The third portion 162 may include an entirety of the first length 102, an entirety of the second length 104, and a portion of the third length 106. The signal 92 may reflect off the object 160 to return to the device 90 (e.g., as a return signal) in a reverse direction along the third portion 162 of the path of travel 93. In other words, the signal 92 travels from the object 160 to the device 90 along the portion of the third length 106, and the respective entireties of the second length 104 and the first length 102. As such, the signal 92 does not travel along a fourth, remaining portion 164 of the path of travel 93, illustrated by the dashed lines in FIG. 4.

Upon receipt of the signal 92 reflected off the object 160, the device 90 may determine a distance traveled by the signal 92 (e.g., the return signal) in the reverse direction along the third portion 162 of the path of travel 93. The device 90 may transmit the determined distance to the control system 58, and the control system 58 may determine the position of the object 160 within the space 98 relative to the device 90 based on the determined distance and parameters associated with the path of travel 93 of the signal 92. It should be noted the Equation 1 and Equation 2 may be used to accurately calculate the position of the object 130 that is shown in FIG. 3 within the space 98 when the object 130 is at a part of the first length 102. However, Equation 1 may be modified to determine the first coordinate of the object 160 that is shown in FIG. 4 because the object 160 is located at another part of the path of travel 93 of the signal 92 after the first length 102, such as at the third length 106. This is because Equation 1 does not account for the signal 92 reversing direction relative to the first axis 108 upon reflection off the surfaces 94, 96. Rather, in such cases, the first coordinate may be determined via Equation 3:

$$x = \text{sine}(a) * \text{Rem}(D/L) \qquad \text{Equation 3}$$

in which a is the angle 100 of contact between the signal 92 and the second surface 96, D is the distance of travel in the reverse direction along the path of travel 93 (e.g., the third portion 162 including the first length 102, the second length 104, and the portion of the third length 106, in the illustrated embodiment), L is the distance associated with an entirety of one of the lengths 102, 104, 106 (e.g., an entirety of the length 102, from a first end at the first surface 94 to a second end at the second surface 96), and Rem(D/L) is the remainder when dividing the distance D by the distance L. That is, Rem(D/L) indicates a portion 166 of the final length (e.g., the third length 106, in the illustrated embodiment) traveled by the signal 92. The second coordinate of the object 160 may still be determined via Equation 2 discussed above, because the second coordinate of the object 160 may be unaffected by the reflection of the signal 92 off the surfaces 94, 96. In other words, the signal 92 does not reverse direction relative to the second axis 110 upon reflection off the surfaces 94, 96 along the path of travel 93 until impact with the object 160. In certain embodiments, the first coordinate and/or the second coordinate may be rounded after calculation via Equation 1, Equation 2, or Equation 3, such as to the nearest integer, to the nearest tenth place, and so forth, to represent an estimate of the first coordinate and/or the second coordinate.

Figure 5:
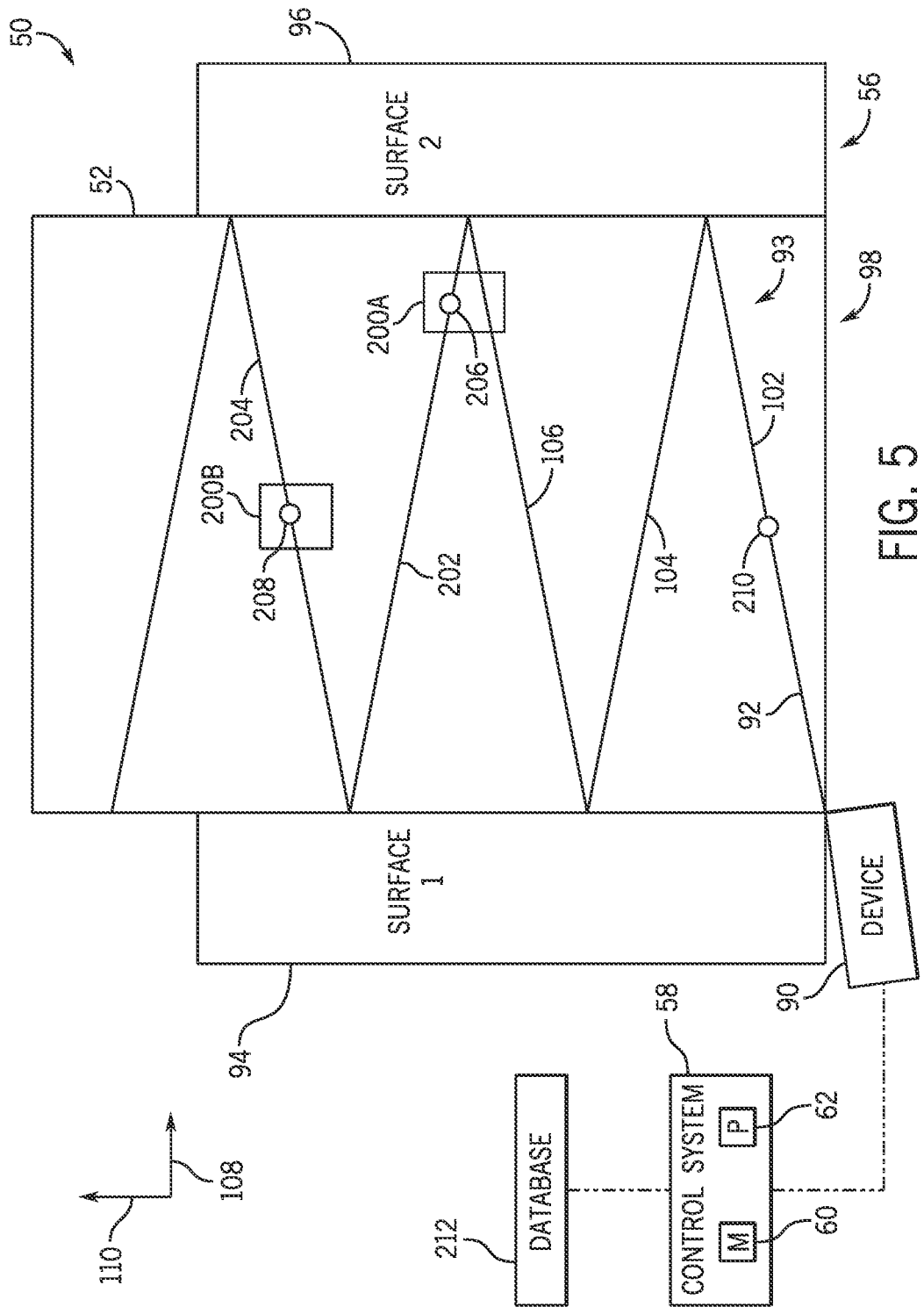
FIG. 5 is a schematic diagram of an embodiment of the interactive system of FIG. 1, in which the interactive feature includes multiple interactive components, in accordance with an aspect of the present disclosure.

FIG. 5 is a schematic diagram of an embodiment of the interactive system 50 having the sensing system 56 implemented with the interactive feature 52, which may include interactive components 200 with which a user (e.g., the user 54 of FIG. 1) may interact. In an embodiment, the interactive feature 52 may include a display (e.g., the display 64), the interactive components 200 may include icons or images presented onto the display, and the user may approach and/or contact the images to interact with the interactive feature 52. Additionally or alternatively, the interactive components 200 may include physical objects with which the user may interact. For instance, the interactive components 200 may include certain interface features, including a button, a dial, a roller, a block, an animated figure, and the like. The interactive components 200 may be positioned so that the user interrupts the signal 92 when the user approaches and/or contacts the interactive components 200. In particular, the interaction between the user and the interactive feature 52 may cause the signal 92 to reflect back to the device 90, and the device 90 may determine the distance traveled by the signal 92 (e.g., the return signal) in the reverse direction along the path of travel 93, in the manner discussed above with respect to FIGS. 2-4. The control system 58 may receive the distance from the device 90 and may determine the location (e.g., the first coordinate along the first axis 108 and the second coordinate along the second axis 110) of interaction between the user and the interactive feature 52. The control system 58 may then determine which of the interactive components 200 the user interacted with based on the position (e.g., a known position, such as known coordinates along the first and second axes 108, 110) of the interactive components 200 within the space 98 and the location (e.g., determined location) of interaction between the user and the interactive feature 52.

For example, in the illustrated embodiment, a first interactive component 200A is positioned proximate to the second surface 96 such that the third length 106 and a fourth length 202 of the path of travel 93 of the signal 92 extends across the first interactive component 200A. Moreover, a second interactive component 200B is positioned above the first interactive component 200A relative to the second axis 110 and is substantially centered between the surfaces 94, 96 such that a fifth length 204 of the path of travel 93 of the signal 92 extends across the second interactive component 200B. The control system 58 may determine whether the user interacted with the first interactive component 200A or the second interactive component 200B by determining the location of interaction between the user and the interactive feature 52.

For instance, based on the distance determined by the device 90, the control system 58 may determine that the user interacted at a first location 206 of the interactive feature 52. The control system 58 may compare the first location 206 (e.g., x, y coordinates) of the interactive feature 52 with respective locations (e.g., x, y coordinates) of the interactive components 200 to determine with which of the interactive components 200 the user interacted. In this case, the control system 58 may determine that the first location 206 matches (e.g., substantially matches, overlaps) with a location of the first interactive component 200A to determine the user interacted with the first interactive component 200A. Similarly, the control system 58 may determine the user interacted at a second location 208 of the interactive feature 52, and the control system 58 may determine that the second location 208 matches (e.g., substantially matches, overlaps) with a location of the second interactive component 200B to determine the user interacted with the second interactive component 200B. Further, the control system 58 may determine that the user interacted at a third location 210 of the interactive feature 52, and the control system 58 may determine that third location 210 does not substantially match with the locations of any of the interactive components 200. Accordingly, upon determining that the user interacted at the third location 210, the control system 58 may determine that the user did not interact with any of the interactive components 200. In this manner, the control system 58 may determine whether an interaction between the user and the interactive components 200 has occurred without having to use additional sensors, such as sensors (e.g., located on the interactive components 200 or surrounding the interactive feature 52) configured to directly determine an interaction between the user and the interactive components 200. Indeed, the configuration of the device 90 and/or the signal 92 output by the device 90 may sufficiently enable determination of the occurrence and location of interactions between various objects and the interactive feature 52.

Based on the determined interaction between the user and the interactive feature 52 (e.g., one of the interactive components 200), the control system 58 may perform further actions. In an example, the control system 58 may cause the interactive feature 52 to present a different image (e.g., on the interactive feature 52) in response to a determination that the user interacted with one of the interactive components 200. For instance, the control system 58 may display movement of the corresponding interactive component 200 to present a realistic interaction between the user and the interactive component 200. In another example, the control system 58 may be communicatively coupled to a database 212, and the control system 58 may update the database 212 based on the interaction. The database 212 may, for example, store information associated with the user (e.g., a number of points associated with a stored user profile), and the control system 58 may update the information (e.g., add additional points to the user profile) stored on the database 212. Therefore, the interactive system 50 may provide the user with an interactive activity, such as an activity (e.g., game) in which multiple users may compete with one another to accumulate the greatest amount of points.

In an additional or alternative embodiment, the control system 58 may perform actions based on whether there is an interaction with the interactive feature 52 regardless of the particular location of the interaction with the interactive feature 52. To this end, the interactive feature 52 may not include the interactive components 200. Instead, for example, the interactive system 50 may be positioned adjacent to an entrance (e.g., a passageway, a space) into a room (e.g., such that the signal 92 travels from one side of the entrance to another side of the entrance; similar to an arrangement shown in FIG. 6), such that the control system 58 may determine whether the user has passed through the entrance to enter the room. For instance, in response to determining that the user has passed through the entrance, the control system 58 may turn on lights to illuminate the room. In another implementation, if the control system 58 determines that someone has passed through the entrance in an unauthorized manner (e.g., during a time interval during which occupancy of the room is blocked), the control system 58 may output a notification, such as a visual output (e.g., a light), an audio output (e.g., a sound), a notification to a mobile device, or the like. In any case, the control system 58 may perform any suitable action based on a determined occurrence of interaction with the interactive feature 52 without having to determine a particular location of the interaction.

Figure 6:
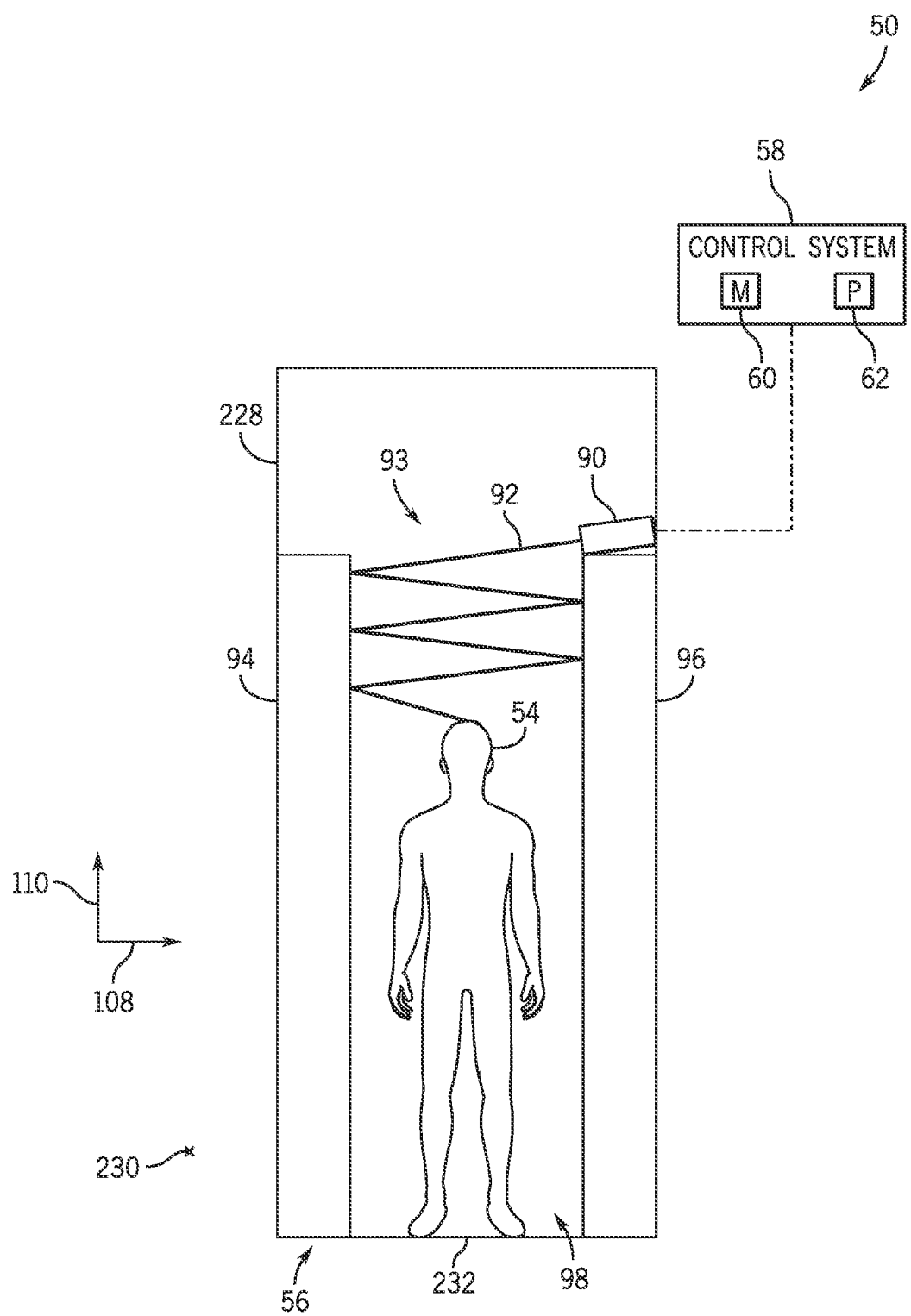
FIG. 6 is a schematic diagram of an embodiment of an interactive system having a sensing system, in which the sensing system is configured to determine a height of a user, in accordance with an aspect of the present disclosure.

FIG. 6 is a schematic diagram of an embodiment of the interactive system 50, in which the sensing system 56 is configured to determine a height of the user 54. In the illustrated embodiment, the user 54 may navigate through the space 98 formed by the surfaces 94, 96 of the sensing system 56. That is, the interactive system 50 may form the space 98 as a passageway 228 (e.g., entrance) through which the user 54 may navigate. For example, the passageway 228 may be adjacent to an entrance of an attraction, such as a roller coaster, a water ride, a tower drop, and the like, such that users may navigate through the space 98 before entering the attraction. As a result, the interactive system 50 may determine the height of each user passing through the passageway 228 so as to determine whether each user is eligible to experience the attraction (e.g., by exceeding a height threshold). To this end, the device 90 may be positioned and oriented such that the device 90 outputs the signal 92 in a downward angle relative to the first axis 108 and the second axis 110. As the user 54 passes through the space 98 generally along a direction that may be substantially perpendicular to the first axis 108 and the second axis 110, the signal 92 may reflect off a part of the user 54. Since the signal 92 generally travels downwardly relative to the second axis 110, the signal 92 may reflect off a top or near a top part of the user 54 to return to the device 90 and provide a determined distance to the device 90. The device 90 may transmit the determined distance to the control system 58, and the control system 58 may determine the location of the reflection off the user 54 (e.g., the second coordinate of the reflection relative to the second axis 110). The control system 58 may further determine the height of the user 54 based on the determined location of reflection. For example, the control system 58 may determine the distance of the reflection relative to a floor 232 to determine the height of the user 54.

The control system 58 may then perform additional actions based on the determined height of the user 54. As an example, if the height of the user 54 does not exceed a certain height threshold, the control system 58 may output a notification, such as to an operator, to indicate the height of the user 54 is below the height threshold. In an additional example, the control system 58 may monitor and/or store the heights of various users 54 over time to determine height characteristics of users 54. In this manner, the control system 58 may determine whether an attraction appeals to users having a certain anthropometry, such as for determining the popularity of the attraction. Changes or improvements to the attraction may then be made based on the determined heights of the users 54.

Figure 7:
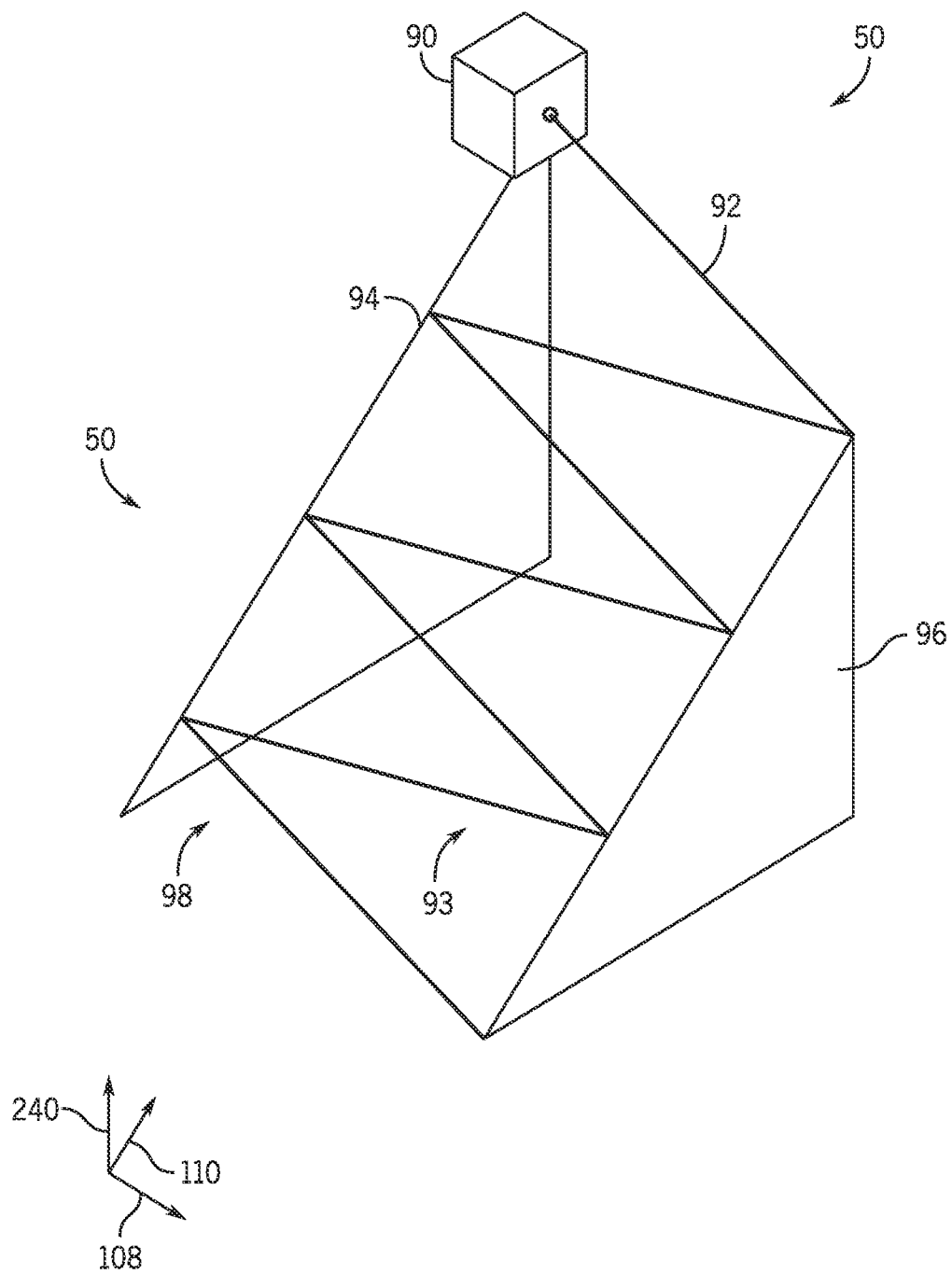
FIG. 7 is a perspective view of an embodiment of an interactive system having a sensing system, in which the sensing system is configured to output a signal that travels relative to three axes, in accordance with an aspect of the present disclosure.

FIG. 7 is a perspective view of an embodiment of the interactive system 50 having the sensing system 56, in which the sensing system 56 is configured to output the signal 92 that travels relative to the first axis 108, the second axis 110, and a third axis 240 (e.g., a vertical axis). In particular, the second axis 110 may be oriented at an acute angle, rather than at a substantially perpendicular angle, relative to the third axis 240. Thus, the signal 92 may travel along a plane formed by the first axis 108 and the second axis 110, transversely to a plane formed by the first axis 108 and the third axis 240, and transversely to a plane formed by the second axis 110 and the third axis 240, such that the signal 92 is directed in a three dimensional path of travel 93 within the space 98 between the first surface 94 and the second surface 96. To this end, the surfaces 94, 96 may be shaped, positioned, and/or oriented in a suitable manner, and the device 90 may be positioned and/or oriented to output the signal 92 toward the surfaces 94, 96 (e.g., to the second surface 96) along the plane formed by the first axis 108 and the second axis 110 in which the second axis 110 is oriented at a particular angle relative to the third axis 240. That is, the device 90 may be oriented to output the signal 92 at a particular angle relative to the plane formed by the first axis 108 and the second axis 110, a particular angle relative to the plane formed by the first axis 108 and the third axis 240, and/or at a particular angle relative to the plane formed by the second axis 110 and the third axis 240. Therefore, the path of travel 93 of the signal 92 may be determined such that a location of reflection of the signal 92 may also be determined. For example, the location of reflection relative to the plane formed by the first axis 108 and the second axis 110 may be determined via Equation 1, Equation 2, and/or Equation 3. Moreover, the location of reflection relative to the plane formed by the first axis 108 and the third axis 240 and/or relative to the plane formed by the second axis 110 relative to the third axis 240 may be determined based on the angle between the second axis 110 relative to the third axis 240 and the location of reflection relative to the plane formed by the first axis 108 and the second axis 110. Indeed, the location of reflection of the signal 92 may include the first coordinate relative to the first axis 108, the second coordinate relative to the second axis 110, and/or a third coordinate relative to the third axis 240, in which the third coordinate relative to the third axis 240 may be determined based at least in part on the first coordinate relative to the first axis 108 and the second coordinate relative to the second axis 110. Accordingly, the location or reflection of the signal 92 may be determined within a three dimensional space.

Figure 8:
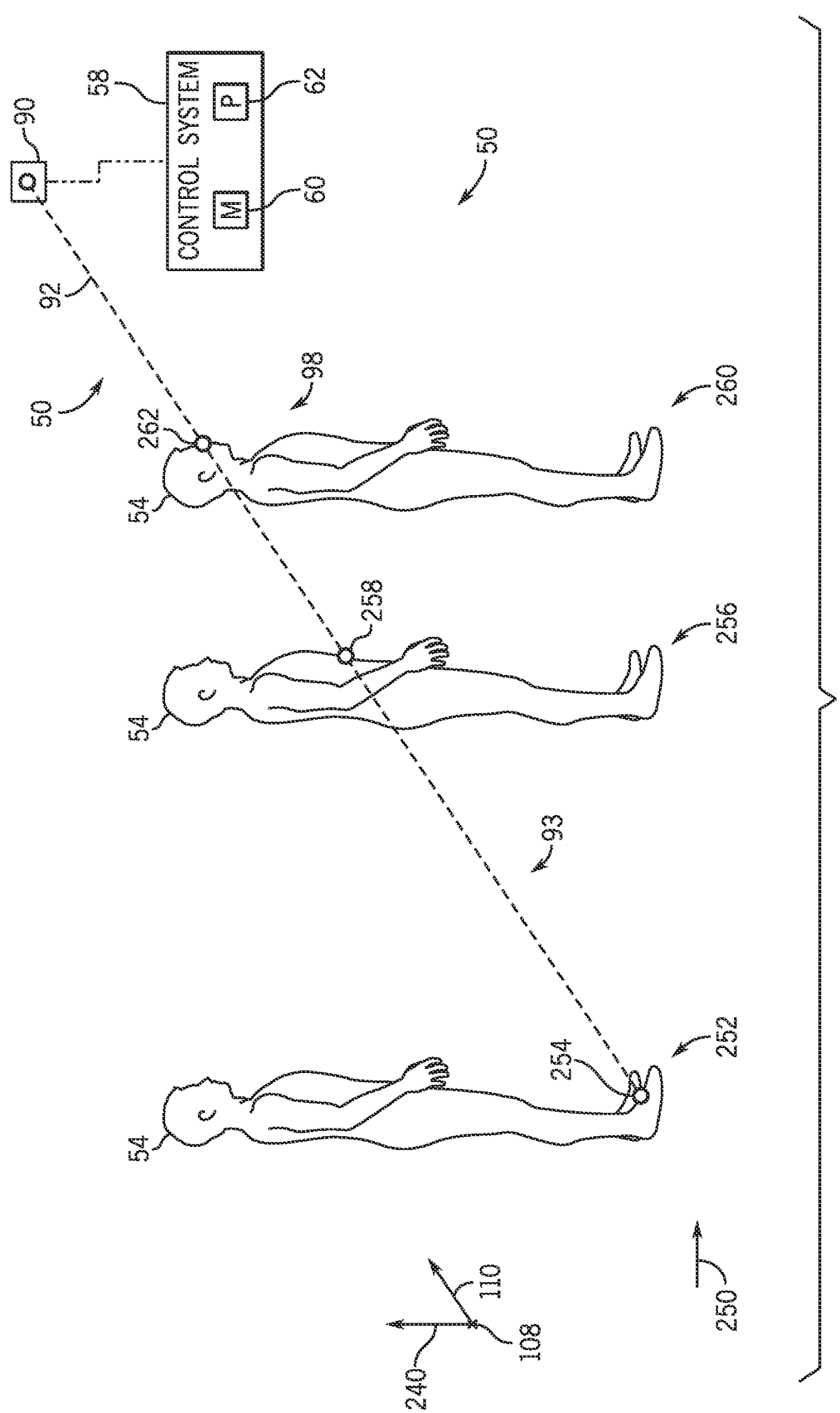
FIG. 8 is a side view of an embodiment of the interactive system of FIG. 7, in which the sensing system is configured to determine a profile of an object, in accordance with an aspect of the present disclosure.

FIG. 8 is a side view of an embodiment of the interactive system 50 having the sensing system 56 arranged as shown in FIG. 7, in which the sensing system 56 is configured to output the signal 92 that travels relative to the first axis 108, the second axis 110, and the third axis 240. The illustrated interactive system 50 may be used to determine a profile of various objects, such as a physical profile of the user 54, which may pass through the space 98 formed by the sensing system 56. By way of example, the user 54 may generally travel along a direction 250 (e.g., perpendicularly relative to the third axis 240 and to the first axis 108) through the space. The user 54 may be at a first position 252 at a first time of operation of the interactive system 50, such that the signal 92 reflects off the user 54 at a first location 254 (e.g., a foot of the user 54). The control system 58 may then associate the first location 254 (e.g., a height relative to the second axis 110) with the first time of operation of the interactive system 50. The user 54 may be at a second position 256 at a second time of operation of the interactive system 50 after the first time, such that the signal 92 reflects off the user 54 at a second location 258 (e.g., the torso of the user 54). The control system 58 may then associate the second location 258 with the second time of operation of the interactive system 50. The user 54 may be at a third position 260 at a third time of operation of the interactive system 50 after the second time, such that the signal 92 reflects off the user 54 at a third location 262 (e.g., the head of the user 54). The control system 58 may then associate the third location 262 with the third time of operation of the interactive system 50. Based on the determined respective associations between the locations 254, 258, 262 and the times, the control system 58 may determine a type of the object within the space, such as that the user 54 is a person in the illustrated embodiment.

In an embodiment, the control system 58 may identify and/or differentiate the object that passes through the space 98, such as via matching techniques (e.g., matching the profile with one of multiple stored profiles). For example, the control system 58 may identify the user 54 as a person and/or distinguish the user 54 from other objects, such as a stroller, an animal, a prop, and so forth. For example, other objects may have different associations between the reflected locations and the times. In an additional or alternative embodiment, the control system 58 may distinguish the user 54 from other users. For instance, the control system 58 may determine certain features of the user 54, such as a height of the user 54, a geometric shape of the profile of the user 54, or any other suitable features of the user 54. The control system 58 may therefore distinguish users 54 from one another based on the determined features. In any case, the control system 58 may determine the profile of objects passing through the space 98 to identify and/or distinguish the objects from one another.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive system, comprising:
    a device configured to output a signal toward a surface such that the signal reflects off the surface at an angle and along a path of travel that extends relative to a first axis and a second axis, and such that an object that interrupts the path of travel of the signal causes a return signal to travel in a reverse direction along the path of travel for receipt by the device; and
    a control system communicatively coupled to the device, wherein the control system is configured to:
        receive data from the device, wherein the data is associated with the receipt of the return signal by the device; and
        determine a position of the object relative to the first axis, the second axis, or both based on the data.

2. The interactive system of claim 1, wherein the data comprises a distance traveled by the return signal in the reverse direction along the path of travel.

3. The interactive system of claim 1, wherein the control system is configured to determine the position of the object relative to the first axis via a first equation, wherein the control system is configured to determine the position of the object relative to the second axis via a second equation, and wherein the first equation and the second equation comprise a distance of travel by the return signal.

4. The interactive system of claim 1, comprising an interactive component, wherein the control system is configured to:
    compare the position of the object with a respective position of the interactive component; and
    determine an interaction with the interactive component has occurred based on a determination that the position of the object matches with the respective position of the interactive component.

5. The interactive system of claim 4, wherein the control system is configured to adjust the interactive component in response to determining the interaction with the interactive component has occurred.

6. The interactive system of claim 4, comprising a database, wherein the control system is configured to update a number of points assigned to a user within the database in response to determining the interaction with the interactive component has occurred.

7. The interactive system of claim 1, comprising a display, wherein the control system is configured to update the display based on the position of the object relative to the first axis, the second axis, or both.

8. The interactive system of claim 1, wherein the control system is configured to determine the position of the object relative to the first axis and the second axis based on the data.

9. The interactive system of claim 1, wherein the device comprises a laser ranging device, a light detection and ranging device, a radar device, a sound navigation ranging device, a photometer, an ultrasonic ranging device, or any combination thereof.

10. An interactive system, comprising:
    a first surface;
    a second surface positioned opposite to the first surface to form a space between the first surface and the second surface;
    a device configured to output a signal toward the first surface such that the signal reflects off the first surface and toward the second surface along a path of travel that extends relative to a first axis and a second axis, and such that an object that interrupts the path of travel of the signal causes the signal to reflect off the object and form a return signal that travels in a reverse direction along the path of travel for receipt by the device; and
    a control system communicatively coupled to the device, wherein the control system is configured to:
        receive data from the device, wherein the data is associated with the receipt of the return signal by the device; and
        determine a position of the object within the space relative to the first axis, the second axis, or both based on the data.

11. The interactive system of claim 10, wherein the data comprises a distance traveled by the return signal in the reverse direction, and wherein the control system is configured to determine the position of the object within the space based on the distance, a length of the path of travel spanning between the first surface and the second surface, and an angle of contact between the signal and the first surface.

12. The interactive system of claim 10, wherein the control system is configured to determine a height of the object relative to a floor based on the position of the object within the space.

13. The interactive system of claim 10, wherein the first surface and the second surface comprise a reflective material.

14. The interactive system of claim 10, wherein the device is configured to output the signal within the space such that the path of travel of the signal comprises a wave-like pattern.

15. The interactive system of claim 10, wherein the control system is configured to operate the interactive system based on determining the position of the object within the space.

16. The interactive system of claim 10, wherein the space is a passageway through which the object travels to interrupt the path of travel of the signal.

17. An interactive system, comprising:
    a first surface;
    a second surface positioned relative to the first surface to form a space between the first surface and the second surface, wherein the space is a passageway through which an object may navigate;
    a device configured to output a signal into the space such that the signal reflects off the first surface and the second surface along a path of travel within the space, and such that the object that interrupts the path of travel of the signal causes the signal to reflect off the object and form a return signal that travels in a reverse direction along the path of travel for receipt by the device, and wherein the device is configured to determine a distance traveled by the return signal upon the receipt of the return signal; and a control system communicatively coupled to the device, wherein the control system is configured to:
receive data from the device, wherein the data is indicative of the distance traveled by the return signal; and
determine a position of the object relative to the device based on the data.

18. The interactive system of claim 17, wherein the path of travel is relative to a first axis, a second axis, and a third axis within the space, and wherein the control system is configured to determine the position of the object relative to the first axis, the second axis, and the third axis.

19. The interactive system of claim 18, wherein the control system is configured to:
determine a plurality of positions of the object;
associate each position of the plurality of positions with a respective time; and
determine a profile of the object based on the association between each position of the plurality of positions with the respective time.

20. The interactive system of claim 17, wherein the device comprises a laser ranging device, a light detection and ranging device, a radar device, a sound navigation ranging device, a photometer, an ultrasonic ranging device, or any combination thereof.

* * * * *